Aug. 5, 1969 R. K. SOOD 3,458,972
METHOD OF DEAERATING SEA WATER
Filed Sept. 11, 1968
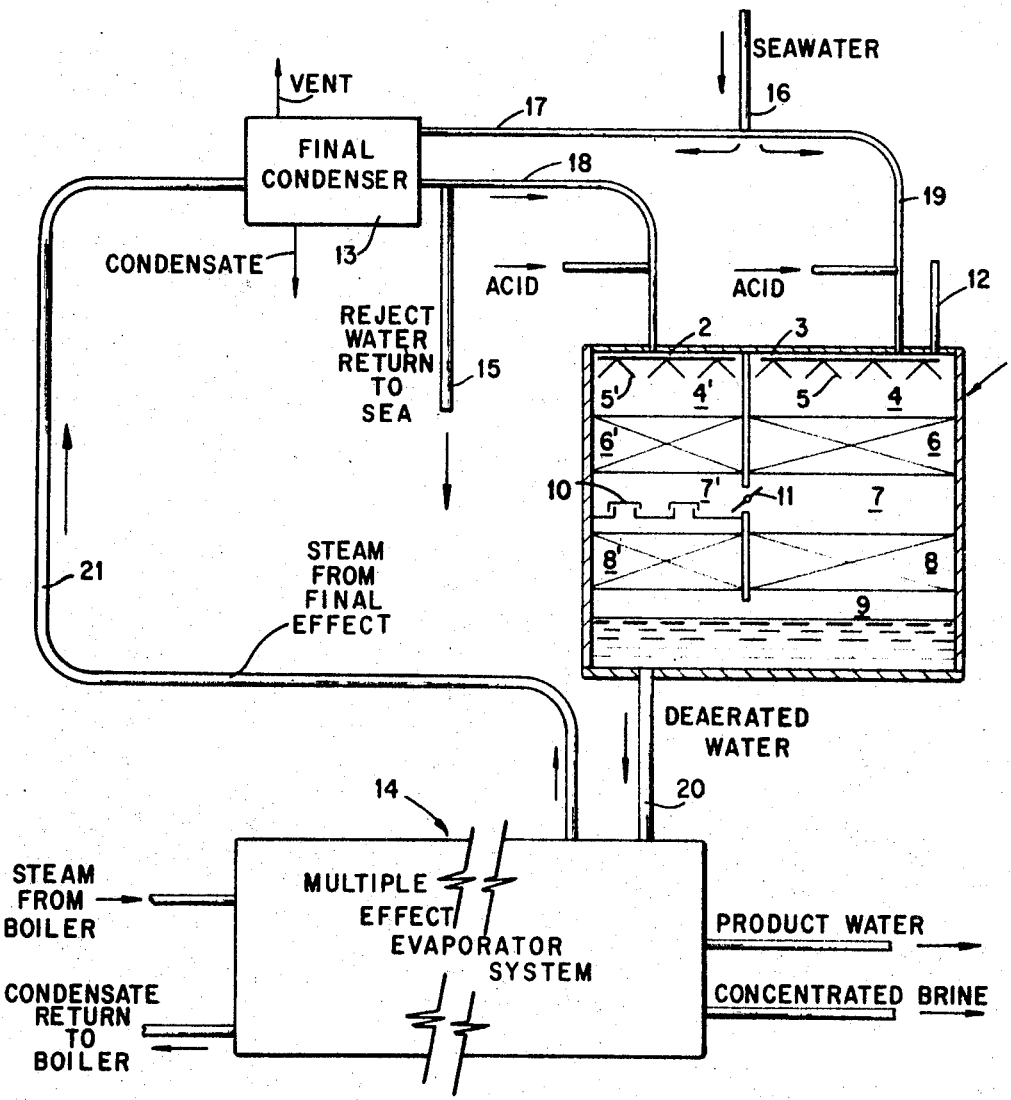
INVENTOR.
Ravinder K. Sood
BY
ATTORNEY.

United States Patent Office 3,458,972
Patented Aug. 5, 1969

3,458,972
METHOD OF DEAERATING SEA WATER
Ravinder K. Sood, Knoxville, Tenn., assignor to the United States of America as represented by the United States Atomic Energy Commission
Filed Sept. 11, 1968, Ser. No. 758,931
Int. Cl. B01d *19/00, 47/06*
U.S. Cl. 55—54                                7 Claims

ABSTRACT OF THE DISCLOSURE

In this method of removing dissolved gases from sea water, two adjacent deaeration chambers are provided both of which are maintained at subatmospheric pressures. Sea water heated in the final condenser of an evaporator system is introduced into a first chamber where a portion of it flashes to vapor, providing an atmosphere which facilitates the removal of dissolved gases. Cold sea water is introduced into the second chamber, wherein it is contacted with steam from the first chamber. Deaerated waters from both chambers are collected in a common sump and removed.

BACKGROUND OF THE INVENTION

This invention was made in the course of, or under, a contract with the United States Atomic Energy Commission during work performed for the United States Department of the Interior.

My invention relates to methods of removing dissolved gases from sea water.

Evaporation is one method by which large quantities of sea water can be desalted for industrial and agricultural use. One of the problems encountered in evaporating sea water arises because untreated sea water is scale forming and highly corrosive to ordinary metals of construction, especially at the elevated temperatures reached in evaporators. However, the scale formation and corrosive action may be minimized by removing dissolved oxygen and carbon dioxide from the sea water. Consequently, conventional sea water evaporation processes incorporate a step of removing these dissolved gases. In a typical method of removing these gases the sea water is sprayed into a chamber maintained at subatmospheric pressure and steam is introduced into the chamber to reduce the partial pressure of the undesirable gases. Such a system is effective in reducing the concentration of oxygen and carbon dioxide to desired levels, but has the disadvantages of requiring large ductwork (to bring steam to and remove it from deaeration equipment) and high capacity condensers to condense steam from the deaeration system.

SUMMARY OF THE INVENTION

It is one object of my invention to provide an improved method of removing dissolved gases from sea water.

It is another object to provide a method of removing gases from sea water which produces feed for the evaporators at an optimum temperature.

It is another object to provide a method of removing gases from sea water which does not require the movement of large quantities of steam to or from the deaeration system.

Other objects of my invention will become apparent from the following description and attached claims.

In accordance with my invention I have provided a method of removing dissolved gases from sea water comprising: continuously introducing a first stream of heated sea water into a first chamber maintained at a pressure low enough to cause a portion of said sea water to flash into vapor, thereby maintaining an atmosphere of water vapor and reducing the partial pressure of oxygen and carbon dioxide within said first chamber, whereby the escape of dissolved gases from the sea water is facilitated; continuously removing said vapor from said first chamber; continuously collecting the deaerated sea water from said first chamber; continuously introducing into a second chamber a second stream of sea water at a lower temperature than said first stream of heated sea water, said second chamber being maintained at a lower pressure than said first chamber; continuously introducing the vapor removed from said first chamber into intimate contact with the sea water introduced into said second chamber, thereby heating said sea water and maintaining an atmosphere of water vapor and reducing the partial pressure of oxygen and carbon dioxide in said second chamber; and continuously collecting the deaerated sea water from said second chamber.

My method of removing dissolved gases from sea water offers the advantages of eliminating large ductwork for transporting steam to and from the deaerator since steam is generated within and most of it is condensed within the deaerator. The condensation of a large part of the steam within the deaerator also eliminates the need for large condensers for the gas-laden effluent stream. In desalination plant application wherein plant reject sea water is employed as the feed to the deaerator, additional heating of the plant reject sea water is not required. Furthermore, the temperature of water from the deaerator may readily be adjusted to an optimum level for feed to an evaporator by adjusting the relative quantities of sea water fed to the hot and cold chambers of the deaerator.

BRIEF DESCRIPTION OF THE DRAWING

The figure is a schematic diagram of an evaporator system containing a deaerator which may be used in carrying out my deaeration process.

In the figure the deaerator housing 1 is partitioned into two zones, a hot chamber 2 and a cold chamber 3. Each of these chambers comprises a series of vertically arranged compartments. Referring to the cold chamber, the compartments comprise the following, proceeding from top to bottom: a spray compartment 4 provided with spray nozzles 5; a packed compartment 6; an unpacked compartment 7; and a packed compartment 8.

The hot side 2 of the deaerator 1 is similar to cold side 3. It has the additional feature of water seal 10 below compartment 7' to permit downflow of liquid but not of water vapor. Compartments 7 and 7' are interconnected through vapor and pressure control valve 11.

Liquid collection compartment 9 serves to collect deaerated sea water from both hot and cold chambers.

Exhaust line 12 connects the deaerator with a vent condenser (not shown).

Deaerated water transfer line 20 connects liquid collection compartment 9 with the multiple effect evaporator system 14. Steam line 21 transports steam from the final effect of the evaporator system to final condenser 13.

DESCRIPTION OF THE PREFERRED EMBODIMENTS

In carrying out my invention an incoming feed stream of sea water is divided into two streams, one of which the deaerator, and the other of which is introduced into the cold chamber at ambient temperature. While other means of heating may be used, passage of the stream to be heated through the final condenser of the evaporator system is a cost-free method of heating the stream.

The ratio of volumes of the two streams, the temperature to which the one stream is heated, the pressures within the deaerator, and temperature of the deaerated sea water are all interrelated. In order to remove dissolved gases efficiently, the partial pressure of the gases in the deaerator must be low and this is achieved by the combination of a steam atmosphere and a low total pressure. The total pressure will normally be in the range of 0.5 to 1.0 pound per square inch, absolute, which is as low as can practically be achieved economically. At a pressure within this range the sea water need be heated to a temperature in the range of 85 to 107° F. in order for sufficient steam to flash to provide the necessary atmosphere. In a typical deaerating process from 0.5 to 2.5 percent of the heated sea water will flash into vapor.

The ratio of mass of cold sea water to hot sea water is determined by the temperature of the two streams and the desired temperature of the combined feed stream. This ratio typically may range from a value as low as 0.14 to 1 to a value as high as 7 to 1.

Under optimum conditions a major portion of the steam flashed on the hot side is condensed in the cold side, thus minimizing the total volume of gas and vapor which must be removed from the deaerator. Typically, the volume of steam removed from the deaerator is from 0.5 to 2 times the volume of oxygen plus carbon dioxide which is removed.

Having thus described my invention, the following example is offered to illustrate it in more detail.

EXAMPLE

A deaerator constructed in accordance with the figure has a housing 30 feet high and is of a rectangular cross section divided into a hot chamber having a cross sectional area of 560 square feet and a cold chamber area of 1250 square feet. In the hot chamber compartments 6' and 8' each contain 2800 cubic feet of packing. In the cold chamber compartments 6 and 8 each contain 6250 cubic feet of packing.

In this system a portion of the desalting plant's reject water at 104.1° F. and containing 7000 parts per billion $O_2$ and 100 parts per million $CO_2$ is sprayed at the rate of $11.16 \times 10^6$ pounds per hour into the hot compartment 4' maintained at a pressure of 0.71 p.s.i.a. Sea water flashes and the resultant water and steam flow down through packing in compartment 6' and into compartment 7' from where vapor passes through valve 11 into cold compartment 7. The temperature in compartment 7' is 90.5° F. The water flows downwardly through water seal 10 and packing in compartment 8', where additional vapor is produced, and from there into collection zone 9. The water in collection zone 9 is at 77° F.

Cold sea water at a temperature of 65° F. and a flow rate of $24.845 \times 10^6$ pounds per hour is sprayed into cold compartment 4 and then flows down through the packing in compartment 6 into compartment 7, through the packing into compartment 8 and into collection zone 9.

The temperature of the sea water in chamber 3 is increased to 77° F. by contact with the steam from the hot chamber. Substantially all of the steam from the hot chamber condenses in the cold chamber, 4300 pounds per hour being swept out, together with 4400 pounds per hour of non-condensable gases through vent 12.

Deaerated sea water containing 50 parts per billion oxygen and 4 parts per million carbon dioxide is fed to the evaporator.

The above example has been given to illustrate my invention, which should be limited only in accordance with the following claims.

I claim:
1. A method of removing dissolved gases from sea water comprising:
    (a) continuously introducing a first stream of heated sea water into a first chamber maintained at a pressure low enough to cause a portion of said sea water to flash into vapor, thereby maintaining an atmosphere of water vapor and reducing the partial pressure of oxygen and carbon dioxide within said first chamber, whereby the escape of dissolved gases from the sea water is facilitated;
    (b) continuously removing said vapor from said first chamber;
    (c) continuously collecting the deaerated sea water from said first chamber;
    (d) continuously introducing into a second chamber a second stream of sea water at a lower temperature than said first stream of heated sea water, said second chamber being maintained at a lower pressure than said first chamber;
    (e) continuously introducing the vapor removed from said first chamber into intimate contact with the sea water introduced into said second chamber, thereby heating said sea water and maintaining an atmosphere of water vapor and reducing the partial pressure of oxygen and carbon dioxide in said second chamber; and
    (f) continuously collecting the deaerated sea water from said second chamber.

2. The method of claim 1 wherein in step (a) the heated sea water is the heat reject portion of a sea water evaporator system.

3. The method of claim 1 wherein the pressure in said first and second chambers is maintained at 0.5 to 1.0 p.s.i.a.

4. The method of claim 1 wherein the cooled sea water collected from said first chamber is at approximately the same temperature as the heated sea water collected from said second chamber.

5. The method of claim 1 wherein the sea water introduced into the first chamber is at a temperature of 85 to 107° F.

6. The method of claim 1 wherein in step (a) .5 to 2.5 percent of the sea water introduced into said first chamber flashes into vapor.

7. The method of claim 1 wherein the ratio of mass of said first stream of sea water to the mass of said second stream of sea water is from 7:1 to 0.14:1.

References Cited

UNITED STATES PATENTS 2,315,481   3/1943   Drewry et al. _____ 55—55 X

REUBEN FRIEDMAN, Primary Examiner

R. W. BURKS, Assistant Examiner

U.S. Cl. X.R.

55—55; 202—174, 176, 177